US012810575B2

(12) United States Patent
Zhou et al.

(10) Patent No.: US 12,810,575 B2
(45) Date of Patent: Nov. 24, 2026

(54) MULTI-ORGAN NUCLEI SEGMENTATION METHOD BASED ON PROMPT LEARNING

(71) Applicants: Qilu University of Technology (Shandong Academy of Sciences), Jinan (CN); SHANDONG COMPUTER SCIENCE CENTER (NATIONAL SUPERCOMPUTING CENTER IN JINAN), Jinan (CN); Shandong Artificial Intelligence Institute, Jinan (CN)

(72) Inventors: Shuwang Zhou, Jinan (CN); Congjian Lu, Jinan (CN); Minglei Shu, Jinan (CN); Pengyao Xu, Jinan (CN); Zhaoyang Liu, Jinan (CN); Ke Shan, Jinan (CN)

(73) Assignees: QILU UNIVERSITY OF TECHNOLOGY (SHANDONG ACADEMY OF SCIENCES), Jinan (CN); SHANDONG COMPUTER SCIENCE CENTER (NATIONAL SUPERCOMPUTING CENTER IN JINAN), Jinan (CN); SHANDONG ARTIFICIAL INTELLIGENCE INSTITUTE, Jinan (CN)

( * ) Notice: Subject to any disclaimer, the term of this patent is extended or adjusted under 35 U.S.C. 154(b) by 223 days.

(21) Appl. No.: 18/731,386

(22) Filed: Jun. 3, 2024

(65) Prior Publication Data

US 2025/0166338 A1 May 22, 2025

(30) Foreign Application Priority Data

Nov. 16, 2023 (CN) ........................ 202311524364.5

(51) Int. Cl.
*G06K 9/00* (2022.01)
*G06V 10/26* (2022.01)
(Continued)

(52) U.S. Cl.
CPC ............ *G06V 10/26* (2022.01); *G06V 10/764* (2022.01); *G06V 10/774* (2022.01); *G06V 10/82* (2022.01); *G06V 2201/031* (2022.01)

(58) Field of Classification Search
CPC .... G06V 10/26; G06V 10/764; G06V 10/774; G06V 10/82; G06V 2201/031
See application file for complete search history.

(56) References Cited

U.S. PATENT DOCUMENTS

2004/0265367 A1* 12/2004 Thorpe .................. C07K 16/44 424/130.1
2005/0183731 A1* 8/2005 Hunter .................... A61L 31/16 623/13.11

(Continued)

OTHER PUBLICATIONS

Zhang, Jianpeng, et al. "Dodnet: Learning to segment multi-organ and tumors from multiple partially labeled datasets." Proceedings of the IEEE/CVF conference on computer vision and pattern recognition. 2021. (Year: 2021).*

(Continued)

*Primary Examiner* — Hadi Akhavannik
(74) *Attorney, Agent, or Firm* — Bayramoglu Law Offices LLC

(57) ABSTRACT

A multi-organ nuclei segmentation method based on prompt learning is provided. The multi-organ nuclei segmentation method fully mines image information based on text and image information and learns an association between semantic information and a segmentation target, thereby achieving comprehensive learning for target region segmentation. The multi-organ nuclei segmentation method learns a large amount of text and image paired knowledge from six (Continued)

publicly available nucleus datasets based on a clip model to acquire prior knowledge for semantic understanding of nuclei, making a model fully suitable for nuclei segmentation. The constructed model inputs images and text prompts, and utilizes text and image information to achieve nucleus recognition and accurate nuclei segmentation of six different organs, improving computational efficiency. The model can also utilize sufficient text prompts to complete accurate segmentation tasks on some unlabeled datasets, achieving practicality and scalability.

10 Claims, 2 Drawing Sheets

(51) Int. Cl.
*G06V 10/764* (2022.01)
*G06V 10/774* (2022.01)
*G06V 10/82* (2022.01)

(56) References Cited

U.S. PATENT DOCUMENTS

2008/0069777 A1* 3/2008 Cohen .................... A61P 19/02
424/9.34
2016/0135466 A1* 5/2016 Will .................. C12N 15/8286
435/418
2016/0239960 A1* 8/2016 Byers ...................... G06F 18/22
2017/0053398 A1* 2/2017 Mahoor .................... G06T 7/42
2019/0080795 A1* 3/2019 Sanghavi .............. G06T 7/0012
2020/0066407 A1* 2/2020 Stumpe ................. G06T 7/0012
2020/0074271 A1* 3/2020 Liang ................... G06N 3/0464
2022/0328189 A1* 10/2022 Zhou ...................... G06V 10/82

OTHER PUBLICATIONS

Ronneberger, Olaf, Philipp Fischer, and Thomas Brox. "U-net: Convolutional networks for biomedical image segmentation." International Conference on Medical image computing and computer-assisted intervention. Cham: Springer international publishing, 2015. (Year: 2015).*

* cited by examiner

MULTI-ORGAN NUCLEI SEGMENTATION METHOD BASED ON PROMPT LEARNING

CROSS-REFERENCE TO THE RELATED APPLICATIONS

This application is based upon and claims priority to Chinese Patent Application No. 202311524364.5, filed on Nov. 16, 2023, the entire contents of which are incorporated herein by reference.

TECHNICAL FIELD

The present disclosure relates to the technical field of medical image processing, and in particular to a multi-organ nuclei segmentation method based on prompt learning.

BACKGROUND

At present, most medical image segmentation models focus only on method improvement and exploration for image data. They rarely involve research on multi-modality guided segmentation, and only consider visual factors, lacking comprehensive learning for target region segmentation. In pathological section analysis, multi-organ cell segmentation is recognized as a difficult topic, and the datasets are usually dedicated to specific nuclei segmentation. Therefore, segmentation models are usually constructed based on a partially labeled dataset or a dataset for a specific organ and can only segment the nuclei of a specific organ. More and more segmentation models show excellent performance in single-organ nuclei segmentation, but research on multi-organ nuclei segmentation using a single segmentation model is still limited. To enable a segmentation model to recognize more organs, the model must be retrained to have the segmentation ability for more organs. Therefore, it is a challenge to guide a segmentation model for multi-organ nuclei segmentation based on the multi-modality information including text and image.

SUMMARY

To overcome the above technical deficiencies, the present disclosure provides a method for accurately performing an unsupervised nuclei segmentation task for a specific organ through a sufficient text prompt on an unlabeled dataset.

In order to solve the technical problem, the present disclosure adopts the following technical solution.

A multi-organ nuclei segmentation method based on prompt learning includes the following steps:

a) acquiring N brain nuclei images, N kidney nuclei images, N liver nuclei images, N breast nuclei images, N colon nuclei images, and N stomach nuclei images to form a nuclei image-text dataset T, $$
\begin{aligned}
T = \{&\text{a nuclei photo of [brain]: } T_1^{brain}, T_2^{brain}, \ldots, T_i^{brain}, \ldots, T_N^{brain};\\
&\text{a nuclei photo of [kidney]: } T_1^{kidney}, T_2^{kidney}, \ldots, T_i^{kidney}, \ldots, T_N^{kidney};\\
&\text{a nuclei photo of [liver]: } T_1^{liver}, T_2^{liver}, \ldots, T_i^{liver}, \ldots, T_N^{liver};\\
&\text{a nuclei photo of [breast]: } T_1^{breast}, T_2^{breast}, \ldots, T_i^{breast}, \ldots, T_N^{breast};\\
&\text{a nuclei photo of [colon]: } T_1^{colon}, T_2^{colon}, \ldots, T_i^{colon}, \ldots, T_N^{colon}\\
&\text{a nuclei photo of [stomach]: } T_1^{stomach}, T_2^{stomach}, \ldots,\\
&T_i^{stomach}, \ldots, T_N^{stomach}\}
\end{aligned},
$$

where $$T_i^{brain}$$

denotes an i-th nuclei image, and a nuclei photo of [brain] is a medical prompt text template for brain;

$$T_i^{kidney}$$

denotes an i-th kidney nuclei image, and a nuclei photo of [liver] is a medical prompt text template for kidney;

$$T_i^{liver}$$

denotes an i-th liver nuclei image, and a nuclei photo of [liver] is a medical prompt text template for liver;

$$T_i^{breast}$$

denotes an i-th breast nuclei image, and a nuclei photo of [breast] is a medical prompt text template for breast;

$$T_i^{colon}$$

denotes an i-th colon nuclei image, and a nuclei photo of [colon] is a medical prompt text template for colon; and $$T_i^{stomach}$$

denotes an i-th stomach nuclei image, and a nuclei photo of [stomach] is a medical prompt text template for stomach;

b) inputting the i-th brain nuclei image $$T_i^{brain}$$

and the medical prompt text template a nuclei photo of [brain] for brain, the i-th kidney nuclei image $$T_i^{kidney}$$

and the medical prompt text template a nuclei photo of [kidney] for kidney, the i-th liver nuclei image $$T_i^{liver}$$

and the medical prompt text template a nuclei photo of [liver] for liver, the i-th breast nuclei image $$T_i^{breast}$$

and the medical prompt text template a nuclei photo of [breast] for breast, the i-th colon nuclei image $$T_i^{colon}$$

and the medical prompt text template a nuclei photo of [colon] for colon, and the i-th stomach nuclei image $$T_i^{stomach}$$

and the medical prompt text template a nuclei photo of [stomach] for stomach in the nuclei image-text dataset T into a clip model to acquire an optimized clip model;

c) acquiring a brain nuclei images, b kidney nuclei images, c liver nuclei images, d breast nuclei images, e colon nuclei images, and f stomach nuclei images from a nuclei instance segmentation (NuInsSeg) dataset, a+b+c+d+e+f=n; and forming a nuclei image-text dataset Y, $$\begin{aligned} Y = \{&\text{a nuclei photo of [brain]}: Y_1^{brain}, Y_2^{brain}, \dots, Y_i^{brain}, \dots, Y_a^{brain};\\ &\text{a nuclei photo of [kidney]}: Y_1^{kidney}, Y_2^{kidney}, \dots, Y_i^{kidney}, \dots, Y_b^{kidney};\\ &\text{a nuclei photo of [liver]}: Y_1^{liver}, Y_2^{liver}, \dots, Y_i^{liver}, \dots, Y_c^{liver};\\ &\text{a nuclei photo of [breast]}: Y_1^{breast}, Y_2^{breast}, \dots, Y_i^{breast}, \dots, Y_d^{breast}; ,\\ &\text{a nuclei photo of [colon]}: Y_1^{colon}, Y_2^{colon}, \dots, Y_i^{colon}, \dots, Y_e^{colon}\\ &\text{a nuclei photo of [stomach]}: Y_1^{stomach}, Y_2^{stomach}, \dots,\\ &Y_i^{stomach}, \dots, Y_f^{stomach}\} \end{aligned}$$

where $$Y_i^{brain}$$

denotes an i-th brain nuclei image, $$Y_i^{kidney}$$

denotes an i-th kidney nuclei image, $$Y_i^{liver}$$

denotes an i-th liver nuclei image, $$Y_i^{breast}$$

denotes an i-th breast nuclei image, $$Y_i^{colon}$$

denotes an i-th colon nuclei image, and $$Y_i^{stomach}$$

denotes an i-th stomach nuclei image;

d) dividing the nuclei image-text dataset Y into a training set and a test set, and scaling the nuclei image in the training set to 572×572;

e) constructing a segmentation network model, including a text module, an image module, and a multilayer perceptron (MILP) module;

f) inputting the medical prompt text template in the training set into the text module to acquire a text vector;

g) inputting the nuclei image in the training set into the image module of the segmentation network model to acquire a nuclei segmentation result image and a feature vector;

h) inputting the feature vector into the MILP module of the segmentation network model to acquire a parameter;

i) updating the segmentation network model through the parameter to acquire an updated segmentation network model;

j) training the updated segmentation network model to acquire an optimized segmentation network model; and k) inputting the nuclei image in the test set into the optimized segmentation network model to acquire a final segmentation result image.

Preferably, N is 500.

Further, the step a) includes: acquiring the N brain nuclei images from a multi-organ nuclei segmentation (MoNuSeg) dataset and/or a CMP-15 dataset and/or a CMP-17 dataset and/or a nuclei instance segmentation dataset of cryosectioned hematoxylin-eosin-stained histological images (CryonNuSeg) dataset and/or the NuInsSeg dataset; acquiring the N kidney nuclei images from the MoNuSeg dataset and/or a kumar dataset and/or an Irshad dataset and/or the CryonNuSeg dataset and/or a multi-organ nuclei segmentation and classification (MoNuSAC) dataset and/or the NuInsSeg dataset; acquiring the N liver nuclei images from the MoNuSeg dataset and/or the CryonNuSeg dataset and/or a Crowedsourced dataset and/or the kumar dataset and/or the NuInsSeg dataset; acquiring the N breast nuclei images from the MoNuSeg dataset and/or the MoNuSAC dataset and/or a nucleus classification, localization and segmentation (Nucls) dataset and/or a triple negative breast cancer (TNBC) dataset and/or a Janowczyk mCryonNuSeg dataset and/or a Gelasca dataset and/or a Naylor dataset and/or the MoNuSAC dataset and/or a NuInsSeg dataset and/or the kumar dataset; acquiring the N colon nuclei images from a colorectal nuclei segmentation and phenotypes (CoNSeP) dataset and/or a CRCHisto dataset and/or the CryonNuSeg dataset and/or the NuInsSeg dataset and/or the kumar dataset; and acquiring the N stomach nuclei images from a MoNuSeg CryonNuSeg dataset and/or a Wienert dataset and/or the NuInsSeg dataset and/or the kumar dataset.

Preferably, the step d) includes: dividing the nuclei image-text dataset Y into the training set and the test set at a ratio of 7:3.

Further, the step f) includes:

f-1) constructing the text module of the segmentation network model, including the optimized clip model;

f-2) inputting the medical prompt text template a nuclei photo of [brain] for brain in the training set into the text module to acquire a text vector $N_{brain}$, $N_{brain} \in R^{L \times N}$, where R denotes a real number space, L denotes a length of a text, and N denotes a length of a last word in the text; and expanding, by a torch.unsqueeze function in a PyTorch library of Python, the text vector $N_{brain}$ by one channel dimension to acquire a text vector $$N'_{brain};$$

f-3) inputting the medical prompt text template a nuclei photo of [kidney] for kidney in the training set into the text module to acquire a text vector $N_{kidney}$, $N_{kidney} \in R^{L \times N}$; and expanding, by the torch.unsqueeze function in the PyTorch library of Python, the text vector $N_{kidney}$ by one channel dimension to acquire a text vector $$N'_{kidney};$$

f-4) inputting the medical prompt text template a nuclei photo of [liver] for liver in the training set into the text module to acquire a text vector $N_{liver}$ $N_{liver} \in R^{L \times N}$; and expanding, by the torch.unsqueeze function in the PyTorch library of Python, the text vector $N_{liver}$, by one channel dimension to acquire a text vector $$N'_{liver};$$

f-5) inputting the medical prompt text template a nuclei photo of [breast] for breast in the training set into the text module to acquire a text vector $N_{breast}$ $N_{breast} \in R^{L \times N}$; and expanding, by the torch.unsqueeze function in the PyTorch library of Python, the text vector $N_{breast}$ by one channel dimension to acquire a text vector $$N'_{breast};$$

f-6) inputting the medical prompt text template a nuclei photo of [colon] for colon in the training set into the text module to acquire a text vector $N_{colon}$, $N_{colon} \in R^{L \times N}$; and expanding, by the torch.unsqueeze function in the PyTorch library of Python, the text vector $N_{colon}$ on by one channel dimension to acquire a text vector $$N'_{colon};$$

and f-7) inputting the medical prompt text template a nuclei photo of [stomach] for stomach in the training set into the text module to acquire a text vector $N_{stomach}$, $N_{stomach} \in$ R L×N; and expanding, by the torch.unsqueeze function in the PyTorch library of Python, the text vector $N_{stomach}$ by one channel dimension to acquire a text vector $$N'_{stomach}.$$

Further, the step g) includes:

g-1) constructing the image module of the segmentation network model, including an image encoder, an image decoder, and a generalizable approximate partitioning (GAP) module;

g-2) constructing the image encoder of the image module, including a first CRM, a second CRM, a third CRM, a fourth CRM, and a fifth CRM; constructing the first CRM, the second CRM, the third CRM, and the fourth CRM, each including a first convolutional layer, a first rectified linear unit (ReLU) activation function, a second convolutional layer, a second ReLU activation function, and a max pooling layer in sequence; constructing the fifth CRM, including a first convolutional layer, a first ReLU activation function, a second convolutional layer, and a second ReLU activation function in sequence; inputting the i-th brain nuclei image $$Y_i^{brain}$$

in the training set into the first CRM to acquire a feature $$PE_1^{brain},$$

inputting the feature $$PE_1^{brain}$$

into the second CRM to acquire a feature $$PE_2^{brain},$$

inputting the feature $$PE_2^{brain}$$

into the third CRM to acquire a feature $$PE_3^{brain},$$

inputting the feature $$PE_3^{brain}$$

into the fourth CRM to acquire a feature $$PE_4^{brain},$$

and inputting the feature $$PE_4^{brain}$$

into the fifth CRM to acquire a feature $$PE_5^{brain};$$

inputting the i-th kidney nuclei image $$Y_i^{kidney}$$

in the training set into the first CRM to acquire a feature $$PE_1^{kidney},$$

inputting the feature $$PE_1^{kidney}$$

into the second CRM to acquire a feature $$PE_2^{kidney},$$

inputting the feature $$PE_2^{kidney}$$

into the third CRM to acquire a feature $$PE_3^{kidney},$$

inputting the feature $$PE_3^{kidney}$$

into the fourth CRM to acquire a feature $$PE_4^{kidney},$$

and inputting the feature $$PE_4^{kidney}$$

into the fifth CRM to acquire a feature $$PE_5^{kidney};$$

inputting the i-th liver nuclei image $$Y_i^{liver}$$

in the training set into the first CRM to acquire a feature $$PE_1^{liver},$$

inputting the feature $$PE_1^{liver}$$

into the second CRM to acquire a feature $$PE_2^{liver},$$

inputting the feature $$PE_2^{liver}$$

into the third CRM to acquire a feature $$PE_3^{liver},$$

inputting the feature $$PE_3^{liver}$$

into the fourth CRM to acquire a feature $$PE_4^{liver},$$

and inputting the feature $$PE_4^{liver}$$

into the fifth CRM to acquire a feature $$PE_5^{liver};$$

inputting the i-th breast nuclei image $$Y_i^{breast}$$

in the training set into the first CRM to acquire a feature $$PE_1^{breast},$$

inputting the feature $$PE_1^{breast}$$

into the second CRM to acquire a feature $$PE_2^{breast},$$

inputting the feature $$PE_2^{breast}$$

into the third CRM to acquire a feature $$PE_3^{breast},$$

inputting the feature $$PE_3^{breast}$$

into the fourth CRM to acquire a feature $$PE_4^{breast},$$

and inputting the feature $$PE_4^{breast}$$

into the fifth CRM to acquire a feature $$PE_5^{breast}$$

inputting the i-th colon nuclei image $$Y_i^{colon}$$

in the training set into the first CRM to acquire a feature $$PE_1^{colon},$$

inputting the feature $$PE_1^{colon}$$

into the second CRM to acquire a feature $$PE_2^{colon},$$

inputting the feature $$PE_2^{colon}$$

into the third CRM to acquire a feature $$PE_3^{colon},$$

inputting the feature $$PE_3^{colon}$$

into the fourth CRM to acquire a feature $$PE_4^{colon},$$

and inputting the feature $$PE_4^{colon}$$

into the fifth CRM to acquire a feature $$PE_5^{colon};$$

and inputting the i-th stomach nuclei image $$Y_i^{stomach}$$

in the training set into the first CRM to acquire a feature $$PE_1^{stomach},$$

inputting the feature $$PE_1^{stomach}$$

into the second CRM to acquire a feature $$PE_2^{stomach},$$

inputting the feature $$PE_2^{stomach}$$

into the third CRM to acquire a feature $$PE_3^{stomach},$$

inputting the feature $$PE_3^{stomach}$$

into the fourth CRM to acquire a feature $$PE_4^{stomach},$$

and inputting the feature $$PE_4^{stomach}$$

into the fifth CRM to acquire a feature $$PE_5^{stomach};$$

g-3) constructing the image decoder of the image module, including a first GRU module, a second GRU module, a third GRU module, and a fourth GRU module; constructing the first GRU module, the second GRU module, the third GRU module, and the fourth GRU module, each including a first convolutional layer, a first ReLU activation function, a second convolutional layer, a second ReLU activation function, and an upsampling layer in sequence; inputting the feature $$PE_5^{brain}$$

into the first CRM to acquire a feature $$PO_1^{brain},$$

inputting the feature $$PO_1^{brain}$$

into the second CRM to acquire a feature $$PO_2^{brain},$$

inputting the feature $$PO_2^{brain}$$

into the third CRM to acquire a feature $$PO_3^{brain},$$

and inputting the feature $$PO_3^{brain}$$

into the fourth CRM to acquire a brain nuclei segmentation result image $$PO_4^{brain};$$

inputting the feature $$PE_5^{kidney}$$

into the first CRM to acquire a feature $$PO_1^{kidney},$$

inputting the feature $$PO_1^{kidney}$$

into the second CRM to acquire a feature $$PO_2^{kidney},$$

inputting the feature $$PO_2^{kidney}$$

into the third CRM to acquire a feature $$PO_3^{kidney},$$

and inputting the feature $$PO_3^{kidney}$$

into the fourth CRM to acquire a kidney nuclei segmentation result image $$PO_4^{kidney};$$

inputting the feature $$PE_5^{liver}$$

into the first CRM to acquire a feature $$PO_1^{liver},$$

inputting the feature $$PO_1^{liver}$$

into the second CRM to acquire a feature $$PO_2^{liver},$$

inputting the feature $$PO_2^{liver}$$

into the third CRM to acquire a feature $$PO_3^{liver},$$

and inputting the feature $$PO_3^{liver}$$

into the fourth CRM to acquire a liver nuclei segmentation result image $$PO_4^{liver};$$

inputting the feature $$PE_5^{breast}$$

into the first CRM to acquire a feature $$PO_1^{breast},$$

inputting the feature $$PO_1^{breast}$$

into the second CRM to acquire a feature $$PO_2^{breast},$$

inputting the feature $$PO_2^{breast}$$

into the third CRM to acquire a feature $$PO_3^{breast},$$

and inputting the feature $$PO_3^{breast}$$

into the fourth CRM to acquire a breast nuclei segmentation result image $$PO_4^{breast};$$

inputting the feature $$PE_5^{colon}$$

into the first CRM to acquire a feature $$PO_1^{colon},$$

inputting the feature $$PO_1^{colon}$$

into the second CRM to acquire a feature $$PO_2^{colon},$$

inputting the feature $$PO_2^{colon}$$

into the third CRM to acquire a feature $$PO_3^{colon},$$

and inputting the feature $$PO_3^{colon}$$

into the fourth CRM to acquire a colon nuclei segmentation result image $$PO_4^{colon};$$

and inputting the feature $$PE_5^{stomach}$$

into the first CRM to acquire a feature $$PO_1^{stomach},$$

inputting the feature $$PO_1^{stomach}$$

into the second CRM to acquire a feature $$PO_2^{stomach},$$

inputting the feature $$PO_2^{stomach}$$

into the third CRM to acquire a feature $$PO_3^{stomach},$$

and inputting the feature $$PO_3^{stomach}$$

into the fourth CRM to acquire a stomach nuclei segmentation result image $$PO_4^{stomach};$$

and g-4) constructing the GAP module of the image module, including a batch normalization (BN) layer, a ReLU activation function, and an adaptive average pooling layer; inputting the feature $$PE_5^{brain}$$

into the GAP module to acquire a feature $PG^{brain}$ inputting the feature $$PE_5^{kidney}$$

into the GAP module to acquire a feature $PG^{kidney}$ inputting the feature $$PE_5^{liver}$$

into the GAP module to acquire a feature $PG^{liver}$, inputting the feature $$PE_5^{breast}$$

into the GAP module to acquire a feature $PG^{breast}$, inputting the feature $$PE_5^{colon}$$

into the GAP module to acquire a feature $PG^{colon}$, and inputting the feature $$PE_5^{stomach}$$

into the GAP module to acquire a feature $PG^{stomach}$; and concatenating the feature $PG^{brain}$ and the text vector $N'_{brain}$ to acquire a feature vector $N_{mer}^{brain}$, concatenating the feature $PG^{kidney}$ and the text vector $N'_{kidney}$ to acquire a feature vector $N_{mer}^{kidney}$, concatenating the feature $PG^{liver}$ and the text vector $N'_{liver}$ to acquire a feature vector $N_{mer}^{liver}$, concatenating the feature $PG^{breast}$ and the text vector $N'_{breast}$ to acquire a feature vector $N_{mer}^{breast}$, concatenating the feature $PG^{colon}$ and the text vector $N'_{colon}$ to acquire a feature vector $N_{mer}^{colon}$, and concatenating the feature $PG^{stomach}$ and the text vector $N'_{stomach}$ to acquire a feature vector $N_{mer}^{stomach}$.

Further, the step h) includes:

h-1) constructing the MLP module of the segmentation network model, including a first convolutional layer, a second convolutional layer, and a third convolutional layer in sequence, where the first convolutional layer, the second convolutional layer, and the third convolutional layer each include a convolutional kernel with a size of 1*1;

h-2) inputting the feature vector $N_{mer}^{brain}$ into the MLP module to acquire a feature $N_1^{brain}$, inputting the feature vector $N_{mer}^{kidney}$ into the MLP module to acquire a feature $N_1^{kidney}$, inputting the feature vector $N_{mer}^{liver}$ into the MLP module to acquire a feature $N_1^{liver}$, inputting the feature vector $N_{mer}^{breast}$ into the MLP module to acquire a feature $N_1^{breast}$, inputting the feature vector $N_{mer}^{colon}$ into the MLP module to acquire a feature $$N_1^{colon},$$

and inputting the feature vector $$N_{mer}^{stomach}$$

into the MLP module to acquire a feature $$N_1^{stomach};$$

and h-3) inputting the feature $$N_1^{brain}$$

into a Sigmoid function to acquire a parameter $$\theta_1^{brain},$$

inputting the feature $$N_1^{kidney}$$

into the Sigmoid function to acquire a parameter $$\theta_1^{kidney},$$

inputting the feature $$N_1^{liver}$$

into the Sigmoid function to acquire a parameter $$\theta_1^{liver}$$

inputting the feature $$N_1^{breast}$$

into the Sigmoid function to acquire a parameter $$\theta_1^{breast},$$

inputting the feature $$N_1^{colon}$$

into the Sigmoid function to acquire the parameter $$\theta_1^{colon},$$

and inputting the feature $$N_1^{stomach}$$

into the Sigmoid function to acquire a parameter $$\theta_1^{stomach}.$$

Further, the step i) includes:

i-1) performing, by a reshape function in the PyTorch library of Python, a reshape operation, through the parameter $$\theta_1^{brain},$$

in the first convolutional layer and the second convolutional layer of each of the first CRM, the second CRM, the third CRM, the fourth CRM, and the fifth CRM of the image encoder; performing a convolution, and an operation by a ReLU activation function in sequence to complete a first update of the image encoder; performing, by the reshape function in the PyTorch library of Python, a reshape operation, through the parameter $$\theta_1^{brain},$$

in in the first convolutional layer and the second convolutional layer of each of the first GRU module, the second GRU module, the third GRU module, and the fourth GRU module of the image decoder; and performing a convolution, and an operation by the ReLU activation function in sequence to complete a first update of the image decoder;

i-2) performing, by the reshape function in the PyTorch library of Python, a reshape operation, through the parameter $$\theta_1^{kidney},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a second update of the image encoder; performing, by the reshape function in the PyTorch library of Python, a reshape operation, through the parameter $$\theta_1^{kidney},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a second update of the image decoder;

i-3) performing, by the reshape function in the PyTorch library of Python, a reshape operation, through the parameter $$\theta_1^{liver},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a third update of the image encoder; performing, by the reshape function in the PyTorch library of Python, a reshape operation, through the parameter $$\theta_1^{liver},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a third update of the image decoder;

i-4) performing, by the reshape function in the PyTorch library of Python, a reshape operation, through the parameter $$\theta_1^{breast},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a fourth update of the image encoder; performing, by the reshape function in the PyTorch library of Python, a reshape operation, through the parameter $$\theta_1^{breast},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a fourth update of the image decoder;

i-5) performing, by the reshape function in the PyTorch library of Python, a reshape operation, through the parameter $$\theta_1^{colon},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a fifth update of the image encoder; performing, by the reshape function in the PyTorch library of Python, a reshape operation, through the parameter $$\theta_1^{colon},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a fifth update of the image decoder; and i-6) performing, by the reshape function in the PyTorch library of Python, a reshape operation, through the parameter $$\theta_1^{stomach},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a sixth update of the image encoder; performing, by the reshape function in the PyTorch library of Python, a reshape operation, through the parameter $$\theta_1^{stomach},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a sixth update of the image decoder, thereby acquiring the updated segmentation network model.

Further, the step j) includes: training, by an adaptive moment estimation (Adam) optimizer, the updated segmentation network model through a Dice similarity coefficient (DSC) loss function to acquire the optimized segmentation network model.

Further, the step k) includes:

k-1) inputting the i-th brain nuclei image $$Y_i^{brain}$$

in the training set into the image encoder and the image decoder of the image module in the optimized segmentation network model in sequence to acquire a final brain nuclei segmentation result image $$PO_4'^{brain};$$

k-2) inputting the i-th kidney nuclei image $$Y_i^{kidney}$$

in the training set into the image encoder and the image decoder of the image module in the optimized segmentation network model in sequence to acquire a final kidney nuclei segmentation result image $$PO_4'^{kidney};$$

k-3) inputting the i-th liver nuclei image $$Y_i^{liver}$$

in the training set into the image encoder and the image decoder of the image module in the optimized segmentation network model in sequence to acquire a final liver nuclei segmentation result image $$PO_4'^{liver};$$

k-4) inputting the i-th breast nuclei image $$Y_i^{breast}$$

in the training set into the image encoder and the image decoder of the image module in the optimized segmentation network model in sequence to acquire a final breast nuclei segmentation result image $$PO_4'^{breast};$$

k-5) inputting the i-th colon nuclei image $$Y_i^{colon}$$

in the training set into the image encoder and the image decoder of the image module in the optimized segmentation network model in sequence to acquire a final colon nuclei segmentation result image $$PO_4'^{colon};$$

and k-6) inputting the i-th stomach nuclei image $$Y_i^{stomach}$$

in the training set into the image encoder and the image decoder of the image module in the optimized segmentation network model in sequence to acquire a final stomach nuclei segmentation result image $$PO_4'^{stomach}.$$

The present disclosure has the following beneficial effects. More and more segmentation models show significant influences in single-organ nuclei segmentation, but research on multi-organ nuclei segmentation using a single segmentation model is still limited and cannot be used in new fields. To solve these problems, the present disclosure proposes a segmentation network model based on text prompt learning. The present disclosure fully mines image information based on text and image information and learns an association between semantic information and a segmentation target, thereby achieving comprehensive learning for target region segmentation. The segmentation network model learns a large amount of text and image paired knowledge from six publicly available nucleus datasets based on the clip model to acquire prior knowledge for semantic understanding of nuclei, making the model fully suitable for nuclei segmentation tasks. The constructed model inputs images and text prompts, and utilizes text and image information to achieve the nucleus recognition and accurate nuclei segmentation of six different organs, improving computational efficiency. The segmentation network model can also utilize sufficient text prompts to complete accurate segmentation tasks on some unlabeled datasets, achieving practicality and scalability.

Table 1 shows models comparison results on the MoNuSeg-2018 dataset and the NuInsSeg dataset;

Table 2 shows AJI, F1-score, and Dice on the MoNuSeg-2018 dataset; and

Table 3 shows model comparison results on the MoNuSeg-2018 dataset and state-of-the-art models (SOTAs).

DETAILED DESCRIPTION OF THE EMBODIMENTS

Figure 1:
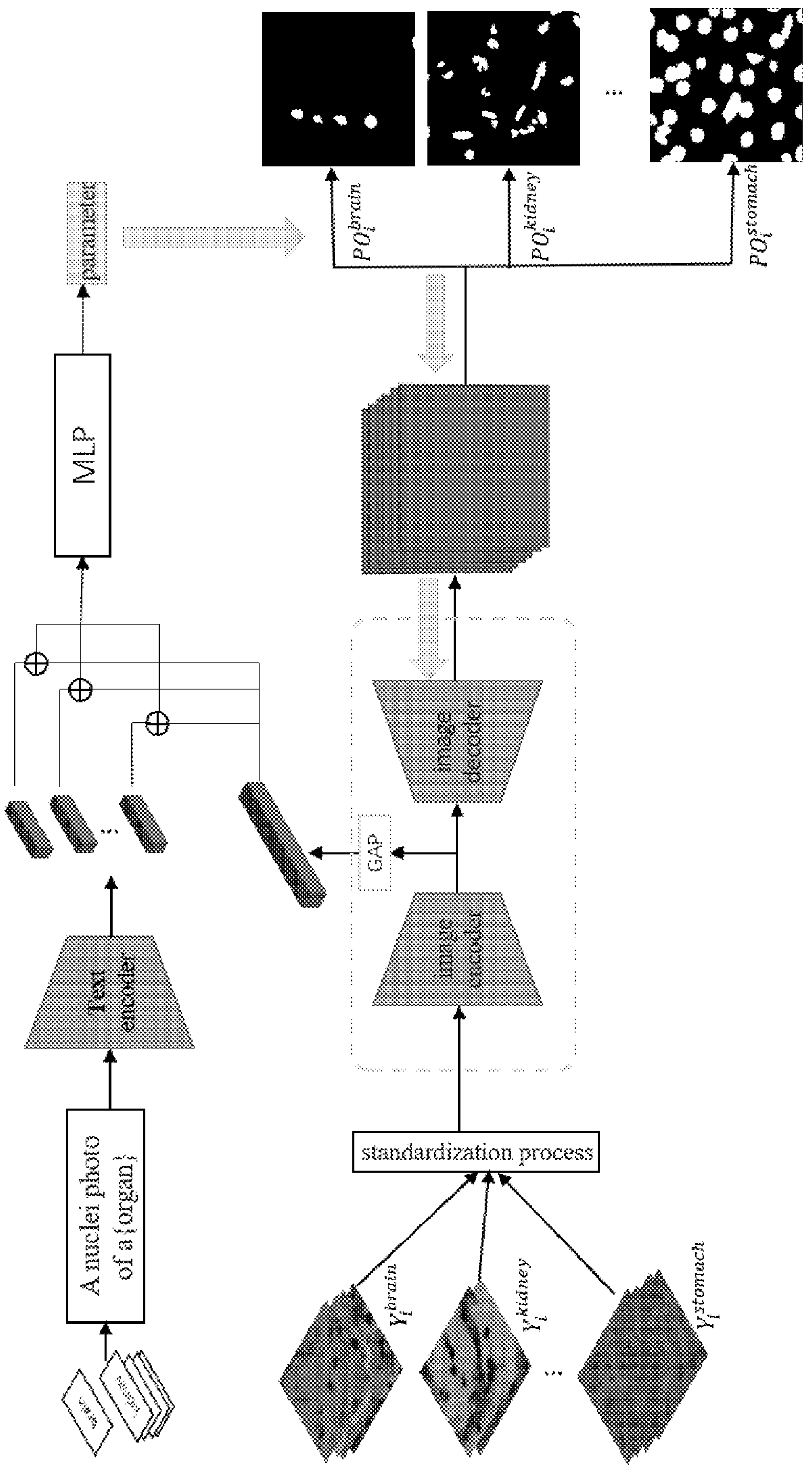
FIG. 1 is a structural diagram of a network according to the present disclosure.

The present disclosure will be described in detail below with reference to FIG. 1.

A multi-organ nuclei segmentation method based on prompt learning includes the following steps.

a) N brain nuclei images, N kidney nuclei images, N liver nuclei images, N breast nuclei images, N colon nuclei images, and N stomach nuclei images are acquired to form nuclei image-text dataset T, $$T = \{\text{a nuclei photo of [brain]}: T_1^{brain}, T_2^{brain}, \ldots, T_i^{brain}, \ldots, T_N^{brain};$$
$$\text{a nuclei photo of [kidney]}: T_1^{kidney}, T_2^{kidney}, \ldots, T_i^{kidney}, \ldots, T_N^{kidney};$$
$$\text{a nuclei photo of [liver]}: T_1^{liver}, T_2^{liver}, \ldots, T_i^{liver}, \ldots, T_N^{liver};$$
$$\text{a nuclei photo of [breast]}: T_1^{breast}, T_2^{breast}, \ldots, T_i^{breast}, \ldots, T_N^{breast};$$
$$\text{a nuclei photo of [colon]}: T_1^{colon}, T_2^{colon}, \ldots, T_i^{colon}, \ldots, T_N^{colon}$$
$$\text{a nuclei photo of [stomach]}: T_1^{stomach}, T_2^{stomach}, \ldots, T_i^{stomach}, \ldots, T_N^{stomach}\}$$

where $$T_i^{brain}$$

denotes an i-th brain nuclei image, and a nuclei photo of [brain] is a medical prompt text template for brain;

$$T_i^{kidney}$$

denotes an i-th kidney nuclei image, and a nuclei photo of [kidney] is a medical prompt text template for kidney;

$$T_i^{liver}$$

denotes an i-th liver nuclei image, and a nuclei photo of [liver] is a medical prompt text template for liver;

$$T_i^{breast}$$

denotes an i-th breast nuclei image, and a nuclei photo of [breast] is a medical prompt text template for breast;

$$T_i^{colon}$$

denotes an i-th colon nuclei image, and a nuclei photo of [colon] is a medical prompt text template for colon; and $$T_i^{stomach}$$

denotes an i-th stomach nuclei image, and a nuclei photo of [stomach] is a medical prompt text template for stomach.

b) The i-th brain nuclei image $$T_i^{brain}$$

and the medical prompt text template a nuclei photo of [brain] for brain, the i-th kidney nuclei image $$T_i^{kidney}$$

and the medical prompt text template a nuclei photo of [kidney] for kidney, the i-th liver nuclei image $$T_i^{liver}$$

and the medical prompt text template a nuclei photo of [liver] for liver, the i-th breast nuclei image $$T_i^{breast}$$

and the medical prompt text template a nuclei photo of [breast] for breast, the i-th colon nuclei image $$T_i^{colon}$$

and the medical prompt text template a nuclei photo of [colon] for colon, and the i-th stomach nuclei image $$T_i^{stomach}$$

and the medical prompt text template a nuclei photo of [stomach] for stomach in the nuclei image-text dataset T are input into a clip model to acquire an optimized clip model.

c) a brain nuclei images, b kidney nuclei images, c liver nuclei images, d breast nuclei images, e colon nuclei images, and f stomach nuclei images are acquired from a nuclei instance segmentation (NuInsSeg) dataset, a+b+c+d+e+f=n. Nuclei image-text dataset Y is formed, $$Y = \{\text{a nuclei photo of [brain]}: Y_1^{brain}, Y_2^{brain}, \ldots, Y_i^{brain}, \ldots, Y_a^{brain};$$
$$\text{a nuclei photo of [kidney]}: Y_1^{kidney}, Y_2^{kidney}, \ldots, Y_i^{kidney}, \ldots, Y_b^{kidney};$$
$$\text{a nuclei photo of [liver]}: Y_1^{liver}, Y_2^{liver}, \ldots, Y_i^{liver}, \ldots, Y_c^{liver};$$
$$\text{a nuclei photo of [breast]}: Y_1^{breast}, Y_2^{breast}, \ldots, Y_i^{breast}, \ldots, Y_d^{breast}; ,$$
$$\text{a nuclei photo of [colon]}: Y_1^{colon}, Y_2^{colon}, \ldots, Y_i^{colon}, \ldots, Y_e^{colon}$$
$$\text{a nuclei photo of [stomach]}: Y_1^{stomach}, Y_2^{stomach}, \ldots, Y_i^{stomach}, \ldots, Y_f^{stomach}\}$$

where $$Y_i^{brain}$$

denotes an i-th brain nuclei image, $$Y_i^{kidney}$$

denotes an i-th kidney nuclei image, $$Y_i^{liver}$$

denotes an i-th liver nuclei image, $$Y_i^{breast}$$

denotes an i-th breast nuclei image, $$Y_i^{colon}$$

denotes an i-th colon nuclei image, and $$Y_i^{stomach}$$

denotes an i-th stomach nuclei image.

d) The nuclei image-text dataset Y is divided into a training set and a test set, and scaling the nuclei image in the training set to 572×572.

e) A segmentation network model is constructed, including a text module, an image module, and a multilayer perceptron (MLLP) module.

f) The medical prompt text template in the training set is input into the text module to acquire a text vector.

g) The nuclei image in the training set is input into the image module of the segmentation network model to acquire a nuclei segmentation result image and a feature vector.

h) The feature vector is input into the MLP module of the segmentation network model to acquire a parameter.

i) The segmentation network model is updated through the parameter to acquire an updated segmentation network model.

j) The updated segmentation network model is trained to acquire an optimized segmentation network model.

k) The nuclei image in the test set is input into the optimized segmentation network model to acquire a final segmentation result image.

The present disclosure provides a multi-organ nuclei segmentation method based on prompt learning, which can segment multiple different types of organ nuclei through text and image information. In addition, the present disclosure can also accurately complete the unsupervised segmentation task of specific organ nuclei on an unlabeled dataset through sufficient text prompts.

In an embodiment of the present disclosure, N is 500. That is, there are 500 nuclei images for each organ.

In an embodiment of the present disclosure, in the step a), the N brain nuclei images are acquired from a multi-organ nuclei segmentation (MoNuSeg) dataset and/or a CMP-15 dataset and/or a CMP-17 dataset and/or a nuclei instance segmentation dataset of cryosectioned hematoxylin-eosin-stained histological images (CryonNuSeg) dataset and/or the NuInsSeg dataset. The N kidney nuclei images are acquired from the MoNuSeg dataset and/or a kumar dataset and/or an Irshad dataset and/or the CryonNuSeg dataset and/or a multi-organ nuclei segmentation and classification (MoNuSAC) dataset and/or the NuInsSeg dataset. The N liver nuclei images are acquired from the MoNuSeg dataset and/or the CryonNuSeg dataset and/or a Crowedsourced dataset and/or the kumar dataset and/or the NuInsSeg dataset. The N breast nuclei images are acquired from the MoNuSeg dataset and/or the MoNuSAC dataset and/or a nucleus classification, localization and segmentation (Nucls) dataset and/or a triple negative breast cancer (TNBC) dataset and/or a Janowczyk mCryonNuSeg dataset and/or a Gelasca dataset and/or a Naylor dataset and/or the MoNuSAC dataset and/or a NuInsSeg dataset and/or the kumar dataset. The N colon nuclei images are acquired from a colorectal nuclei segmentation and phenotypes (CoNSeP) dataset and/or a CRCHisto dataset and/or the CryonNuSeg dataset and/or the NuInsSeg dataset and/or the kumar dataset. The N stomach nuclei images are acquired from a MoNuSeg CryonNuSeg dataset and/or a Wienert dataset and/or the NuInsSeg dataset and/or the kumar dataset.

In an embodiment of the present disclosure, in the step d), the nuclei image-text dataset Y is divided into the training set and the test set at a ratio of 7:3.

In an embodiment of the present disclosure, the step f) is as follows.

f-1) The text module of the segmentation network model is constructed, including the optimized clip model.

f-2) The medical prompt text template a nuclei photo of [brain] for brain in the training set is input into the text module to acquire text vector $N_{brain}$, $N_{brain} \in R^{L \times N}$, where R denotes a real number space, L denotes a length of a text, and N denotes a length of a last word in the text. The text vector $N_{brain}$ is expanded by one channel dimension by a torch.unsqueeze function in a PyTorch library of Python to acquire text vector $N'_{brain}$.

f-3) The medical prompt text template a nuclei photo of [kidney] for kidney in the training set is input into the text module to acquire text vector $N_{kidney}$, $N_{kidney} \in R^{L \times N}$ The text vector $N_{kidney}$ is expanded by one channel dimension by the torch.unsqueeze function in the PyTorch library of Python to acquire text vector $N'_{kidney}$ f-4) The medical prompt text template a nuclei photo of [liver] for liver in the training set is input into the text module to acquire text vector $N_{liver}$, $N_{liver} \in R^{L \times N}$. The text vector $N_{liver}$ is expanded by one channel dimension by the torch.unsqueeze function in the PyTorch library of Python to acquire text vector $N'_{liver}$.

f-5) The medical prompt text template a nuclei photo of [breast] for breast in the training set is input into the text module to acquire text vector $N_{breast}$, $N_{breast} \in R^{L \times N}$. The text vector $N_{breast}$ is expanded by one channel dimension by the torch.unsqueeze function in the PyTorch library of Python to acquire text vector $N'_{breast}$.

f-6) The medical prompt text template a nuclei photo of [colon] for colon in the training set is input into the text module to acquire text vector $N_{colon}$, $N_{colon} \in R^{L \times N}$. The text vector $N_{colon}$ is expanded by one channel dimension by the torch.unsqueeze function in the PyTorch library of Python to acquire text vector $N'_{colon}$.

f-7) The medical prompt text template a nuclei photo of [stomach] for stomach in the training set is input into the text module to acquire text vector $N_{stomach}$, $N_{stomach} \in R^{L \times N}$. The text vector $N_{stomach}$ is expanded by one channel dimension by the torch.unsqueeze function in the PyTorch library of Python to acquire text vector $N'_{stomach}$.

In an embodiment of the present disclosure, the step g) is as follows.

g-1) The image module of the segmentation network model is constructed, including an image encoder, an image decoder, and a generalizable approximate partitioning (GAP) module.

g-2) The image encoder of the image module is constructed, including a first CRM, a second CRM, a third CRM, a fourth CRM, and a fifth CRM. The first CRM, the second CRM, the third CRM, and the fourth CRM are constructed, each including a first convolutional layer, a first rectified linear unit (ReLU) activation function, a second convolutional layer, a second ReLU activation function, and a max pooling layer in sequence. The fifth CRM is constructed, including a first convolutional layer, a first ReLU activation function, a second convolutional layer, and a second ReLU activation function in sequence. The i-th brain nuclei image $$Y_i^{brain}$$

in the training set is input into the first CRM to acquire feature $$PE_1^{brain},\ Y_i^{brain} \in R^{C \times H \times W},$$

where C, H, and W denote a channel number, a height, and a width of the image, respectively. The feature $$PE_1^{brain}$$

in is input into the second CRM to acquire feature $$PE_2^{brain},$$

the feature $$PE_2^{brain}$$

is input into the third CRM to acquire feature $$PE_3^{brain},$$

the feature $$PE_3^{brain},$$

is input into the fourth CRM to acquire feature $$PE_4^{brain}$$

and the feature $$PE_4^{brain},$$

is input into the fifth CRM to acquire feature $$PE_5^{brain}.$$

The i-th kidney nuclei image $$Y_i^{kidney}$$

in the training set is input into the first CRM to acquire feature $$PE_1^{kidney},\ Y_i^{kidney} \in R^{C \times H \times W},$$

the feature $$PE_1^{kidney}$$

is input into the second CRM to acquire feature $$PE_2^{kidney},$$

the feature $$PE_2^{kidney}$$

is input into the third CRM to acquire feature $$PE_3^{kidney},$$

the feature $$PE_3^{kidney}$$

is input into the fourth CRM to acquire feature $$PE_4^{kidney},$$

and the feature $$PE_4^{kidney}$$

is input into the fifth CRM to acquire feature $$PE_5^{kidney}.$$

The i-th liver nuclei image $$Y_i^{liver}$$

in the training set is input into the first CRM to acquire feature $$PE_1^{liver}, Y_i^{liver} \in R^{C \times H \times W}$$

inputting the feature $$PE_1^{liver}$$

is input into the second CRM to acquire feature $$PE_2^{liver},$$

the feature $$PE_2^{liver}$$

is input into the third CRM to acquire feature $$PE_3^{liver},$$

the feature $$PE_3^{liver}$$

is input into the fourth CRM to acquire feature $$PE_4^{liver},$$

and the feature $$PE_4^{liver}$$

is input into the fifth CRM to acquire feature $$PE_5^{liver}.$$

The i-th breast nuclei image $$Y_i^{breast}$$

in the training set is input into the first CRM to acquire feature $$PE_1^{breast}, Y_i^{breast} \in R^{C \times H \times W},$$

the feature $$PE_1^{breast}$$

is input into the second CRM to acquire feature $$PE_2^{breast},$$

the feature $$PE_2^{breast}$$

is input into the third CRM to acquire feature $$PE_3^{breast},$$

the feature $$PE_3^{breast}$$

is input into the fourth CRM to acquire feature $$PE_4^{breast},$$

and the feature $$PE_4^{breast}$$

is input into the fifth CRM to acquire feature $$PE_5^{breast}.$$

The i-th colon nuclei image $$Y_i^{colon}$$

in the training set is input into the first CRM to acquire feature $$PE_1^{colon},\ Y_i^{colon} \in R^{C \times H \times W},$$

the feature $$PE_1^{colon}$$

is input into the second CRM to acquire feature $$PE_2^{colon},$$

the feature $$PE_2^{colon}$$

is input into the third CRM to acquire feature $$PE_3^{colon},$$

the feature $$PE_3^{colon}$$

is input into the fourth CRM to acquire feature $$PE_4^{colon},$$

and the feature $$PE_4^{colon}$$

is input into the fifth CRM to acquire feature $$PE_5^{colon}$$

The i-th stomach nuclei image $$Y_i^{stomach}$$

in the training set is input into the first CRM to acquire feature $$PE_1^{stomach},\ Y_i^{stomach} \in R^{C \times H \times W},$$

the feature $$PE_1^{stomach}$$

is input into the second CRM to acquire feature $$PE_2^{stomach},$$

the feature $$PE_2^{stomach}$$

is input into the third CRM to acquire feature $$PE_3^{stomach},$$

the feature $$PE_3^{stomach}$$

is input into the fourth CRM to acquire feature $$PE_4^{stomach},$$

and the feature $$PE_4^{stomach}$$

is input into the fifth CRM to acquire feature $$PE_5^{stomach}.$$

g-3) The image decoder of the image module is constructed, including a first GRU module, a second GRU module, a third GRU module, and a fourth GRU module. The first GRU module, the second GRU module, the third GRU module, and the fourth GRU module are constructed, each including a first convolutional layer, a first ReLU activation function, a second convolutional layer, a second ReLU activation function, and an upsampling layer in sequence. The feature $$PE_5^{brain}$$

is input into the first CRM to acquire feature $$PO_1^{brain},$$

the feature $$PO_1^{brain}$$

is input into the second CRM to acquire feature $$PO_2^{brain},$$

the feature $$PO_2^{brain}$$

is input into the third CRM to acquire feature $$PO_3^{brain},$$

and the feature $$PO_3^{brain}$$

is input into the fourth CRM to acquire brain nuclei segmentation result image $$PO_4^{brain}.$$

The feature $$PE_5^{kidney}$$

is input into the first CRM to acquire feature $$PO_1^{kidney},$$

the feature $$PO_1^{kidney}$$

is input into the second CRM to acquire feature $$PO_2^{kidney},$$

the feature $$PO_2^{kidney}$$

is input into the third CRM to acquire feature $$PO_3^{kidney},$$

and the feature $$PO_3^{kidney}$$

is input into the fourth CRM to acquire kidney nuclei segmentation result image $$PO_4^{kidney}.$$

The feature $$PE_5^{liver}$$

is input into the first CRM to acquire feature $$PO_1^{liver},$$

the feature $$PO_1^{liver}$$

is input into the second CRM to acquire feature $$PO_2^{liver},$$

the feature $$PO_2^{liver}$$

is input into the third CRM to acquire feature $$PO_3^{liver},$$

and the feature $$PO_3^{liver}$$

is input into the fourth CRM to acquire liver nuclei segmentation result image $$PO_4^{liver}.$$

The feature $$PE_5^{breast}$$

is input into the first CRM to acquire feature $$PO_1^{breast},$$

the feature $$PO_1^{breast}$$

is input into the second CRM to acquire feature $$PO_2^{breast},$$

the feature $$PO_2^{breast}$$

is input into the third CRM to acquire feature $$PO_3^{breast},$$

and the feature $$PO_3^{breast}$$

is input into the fourth CRM to acquire breast nuclei segmentation result image $$PO_4^{breast}.$$

The feature $$PE_5^{colon}$$

is input into the first CRM to acquire feature $$PO_1^{colon},$$

the feature $$PO_1^{colon}$$

is input into the second CRM to acquire feature $$PO_2^{colon},$$

the feature $$PO_2^{colon}$$

is input into the third CRM to acquire feature $$PO_3^{colon},$$

and the feature $$PO_3^{colon}$$

is input into the fourth CRM to acquire colon nuclei segmentation result image $$PO_4^{colon}.$$

The feature $$PE_5^{stomach}$$

is input into the first CRM to acquire feature $$PO_1^{stomach},$$

the feature $$PO_1^{stomach}$$

is input into the second CRM to acquire feature $$PO_2^{stomach},$$

the feature $$PO_2^{stomach}$$

is input into the third CRM to acquire feature $$PO_3^{stomach},$$

and the feature $$PO_3^{stomach}$$

is input into the fourth CRM to acquire stomach nuclei segmentation result image $$PO_4^{stomach}.$$

g-4) The GAP module of the image module is constructed, including a batch normalization (BN) layer, a ReLU activation function, and an adaptive average pooling layer. The feature $$PE_5^{brain}$$

is input into the GAP module to acquire feature $PG^{brain}$, the feature $$PE_5^{kidney}$$

is input into the GAP module to acquire feature $PG^{kidney}$, the feature $$PE_5^{liver}$$

is input into the GAP module to acquire feature $PG^{liver}$, the feature $$PE_5^{breast}$$

is input into the GAP module to acquire feature $PG^{breast}$, the feature $$PE_5^{colon}$$

is input into the GAP module to acquire feature $PG^{colon}$, and the feature $$PE_5^{stomach}$$

is input into the GAP module to acquire feature $PG^{stomach}$. The feature $PG^{brain}$ and the text vector $$N'_{brain}$$

are concatenated to acquire feature vector $$N_{mer}^{brain}.$$

The feature $PG^{kidney}$ and the text vector $$N'_{kidney}$$

are concatenated to acquire feature vector $$N_{mer}^{kidney}.$$

The feature $PG^{liver}$ and the text vector $$N'_{liver}$$

are concatenated to acquire feature vector $$N_{mer}^{liver}.$$

The feature $PG^{breast}$ and the text vector $$N'_{breast}$$

are concatenated to acquire feature vector $$N_{mer}^{breast}.$$

The feature $PG^{colon}$ and the text vector $$N'_{colon}$$

are concatenated to acquire feature vector $$N_{mer}^{colon}.$$

The feature $PG^{stomach}$ and the text vector $$N'_{stomach}$$

are concatenated to acquire feature vector $$N_{mer}^{stomach}.$$

In an embodiment of the present disclosure, the step h) is as follows.

h-1) The MLP module of the segmentation network model is constructed, including a first convolutional layer, a second convolutional layer, and a third convolutional layer in sequence, where the first convolutional layer, the second convolutional layer, and the third convolutional layer each include a convolutional kernel with a size of 1*1.

h-2) The feature vector $$N_{mer}^{brain}$$

is input into the MLP module to acquire feature $$N_1^{brain},$$

the feature vector $$N_{mer}^{kidney}$$

is input into the MLP module to acquire feature $$N_1^{kidney},$$

the feature vector $$N_{mer}^{liver}$$

is input into the MLP module to acquire feature $$N_1^{liver},$$

the feature vector $$N_{mer}^{breast}$$

is input into the MLP module to acquire feature $$N_1^{breast},$$

the feature vector $$N_{mer}^{colon}$$

is input into the MLP module to acquire feature $$N_1^{colon},$$

and the feature vector $$N_{mer}^{stomach}$$

is input into the MLP module to acquire feature $$N_1^{stomach}.$$

The feature $$N_1^{brain}$$

is input into a Sigmoid function to acquire parameter $$\theta_1^{brain},$$

the feature $$N_1^{kidney}$$

is input is input into the Sigmoid function to acquire parameter $$\theta_1^{kidney},$$

the feature $$N_1^{liver}$$

is input is input into the Sigmoid function to acquire parameter $$\theta_1^{liver},$$

the feature $$N_1^{breast}$$

is input is input into the Sigmoid function to acquire parameter $$\theta_1^{breast},$$

the feature $$N_1^{colon}$$

is input into the Sigmoid function to acquire the parameter $$\theta_1^{colon},$$

and the feature $$N_1^{stomach}$$

is input is input into the Sigmoid function to acquire parameter $$\theta_1^{stomach}.$$

In an embodiment of the present disclosure, the step i) is as follows.

i-1) A reshape operation is performed by a reshape function in the PyTorch library of Python, through the parameter $$\theta_1^{brain},$$

in the first convolutional layer and the second convolutional layer of each of the first CRM, the second CRM, the third CRM, the fourth CRM, and the fifth CRM of the image encoder. A convolution, and an operation by a ReLU activation function are performed in sequence to complete a first update of the image encoder. A reshape operation is performed by the reshape function in the PyTorch library of Python, through the parameter $$\theta_1^{brain},$$

in the first convolutional layer and the second convolutional layer of each of the first GRU module, the second GRU module, the third GRU module, and the fourth GRU module of the image decoder. A convolution, and an operation by the ReLU activation function are performed in sequence to complete a first update of the image decoder.

i-2) A reshape operation is performed by the reshape function in the PyTorch library of Python, through the parameter $$\theta_1^{kidney},$$

in the first convolutional layer and the second convolutional layer of each of the first CRM, the second CRM, the third CRM, the fourth CRM, and the fifth CRM of the image encoder. A convolution, and an operation by the ReLU activation function are performed in sequence to complete a second update of the image encoder. A reshape operation is performed by the reshape function in the PyTorch library of Python, through the parameter $$\theta_1^{kidney},$$

in the first convolutional layer and the second convolutional layer of each of the first GRU module, the second GRU module, the third GRU module, and the fourth GRU module of the image decoder. A convolution, and an operation by the ReLU activation function are performed in sequence to complete a second update of the image decoder.

i-3) A reshape operation is performed by the reshape function in the PyTorch library of Python, through the parameter $$\theta_1^{liver},$$

in the first convolutional layer and the second convolutional layer of each of the first CRM, the second CRM, the third CRM, the fourth CRM, and the fifth CRM of the image encoder. A convolution, and an operation by the ReLU activation function are performed in sequence to complete a third update of the image encoder. A reshape operation is performed by the reshape function in the PyTorch library of Python, through the parameter $$\theta_1^{liver},$$

in the first convolutional layer and the second convolutional layer of each of the first GRU module, the second GRU module, the third GRU module, and the fourth GRU module of the image decoder. A convolution, and an operation by the ReLU activation function are performed in sequence to complete a third update of the image decoder.

i-4) A reshape operation is performed by the reshape function in the PyTorch library of Python, through the parameter $$\theta_1^{breast},$$

in the first convolutional layer and the second convolutional layer of each of the first CRM, the second CRM, the third CRM, the fourth CRM, and the fifth CRM of the image encoder. A convolution, and an operation by the ReLU activation function are performed in sequence to complete a fourth update of the image encoder. A reshape operation is performed by the reshape function in the PyTorch library of Python, through the parameter $$\theta_1^{breast},$$

in the first convolutional layer and the second convolutional layer of each of the first GRU module, the second GRU module, the third GRU module, and the fourth GRU module of the image decoder. A convolution, and an operation by the ReLU activation function are performed in sequence to complete a fourth update of the image decoder.

i-5) A reshape operation is performed by the reshape function in the PyTorch library of Python, through the parameter $$\theta_1^{colon},$$

in the first convolutional layer and the second convolutional layer of each of the first CRM, the second CRM, the third CRM, the fourth CRM, and the fifth CRM of the image encoder. A convolution, and an operation by the ReLU activation function are performed in sequence to complete a fifth update of the image encoder. A reshape operation is performed by the reshape function in the PyTorch library of Python, through the parameter $$\theta_1^{colon},$$

in the first convolutional layer and the second convolutional layer of each of the first GRU module, the second GRU module, the third GRU module, and the fourth GRU module of the image decoder. A convolution, and an operation by the ReLU activation function are performed in sequence to complete a fifth update of the image decoder.

i-6) A reshape operation is performed by the reshape function in the PyTorch library of Python, through the parameter $$\theta_1^{stomach},$$

in the first convolutional layer and the second convolutional layer of each of the first CRM, the second CRM, the third CRM, the fourth CRM, and the fifth CRM of the image encoder. A convolution, and an operation by the ReLU activation function are performed in sequence to complete a sixth update of the image encoder. A reshape operation is performed by the reshape function in the PyTorch library of Python, through the parameter $$\theta_1^{stomach},$$

in the first convolutional layer and the second convolutional layer of each of the first GRU module, the second GRU module, the third GRU module, and the fourth GRU module of the image decoder. A convolution, and an operation by the ReLU activation function are performed in sequence to complete a sixth update of the image decoder, thereby acquiring the updated segmentation network model.

In an embodiment of the present disclosure, in the step j), the updated segmentation network model is trained by an adaptive moment estimation (Adam) optimizer through a Dice similarity coefficient (DSC) loss function to acquire the optimized segmentation network model.

In an embodiment of the present disclosure, the step k) is as follows.

k-1) The i-th brain nuclei image $$Y_i^{brain}$$

in the training set is input into the image encoder and the image decoder of the image module in the optimized segmentation network model in sequence to acquire final brain nuclei segmentation result image $$PO_4'^{brain}.$$

k-2) The i-th kidney nuclei image $$Y_i^{kidney}$$

in the training set is input into the image encoder and the image decoder of the image module in the optimized segmentation network model in sequence to acquire final kidney nuclei segmentation result image $$PO_4'^{kidney}.$$

k-3) The i-th liver nuclei image $$Y_i^{liver}$$

in the training set is input into the image encoder and the image decoder of the image module in the optimized segmentation network model in sequence to acquire final liver nuclei segmentation result image $$PO_4'^{liver}.$$

k-4) The i-th breast nuclei image $$Y_i^{breast}$$

in the training set is input into the image encoder and the image decoder of the image module in the optimized segmentation network model in sequence to acquire final breast nuclei segmentation result image $$PO_4'^{breast}.$$

k-5) The i-th colon nuclei image $$Y_i^{colon}$$

in the training set is input into the image encoder and the image decoder of the image module in the optimized segmentation network model in sequence to acquire final colon nuclei segmentation result image $$PO_4'^{colon}.$$

k-6) The i-th stomach nuclei image $$Y_i^{stomach}$$

in the training set is input into the image encoder and the image decoder of the image module in the optimized segmentation network model in sequence to acquire final stomach nuclei segmentation result image $$PO_4'^{stomach}.$$

Finally, it should be noted that the above descriptions are only preferred embodiments of the present disclosure, and are not intended to limit the present disclosure. Although the present disclosure has been described in detail with reference to the foregoing embodiments, those skilled in the art may still modify the technical solutions described in the foregoing embodiments, or equivalently substitute some technical features thereof. Any modification, equivalent substitution, improvement, etc. within the spirit and principles of the present disclosure shall fall within the scope of protection of the present disclosure.

Figure 2:
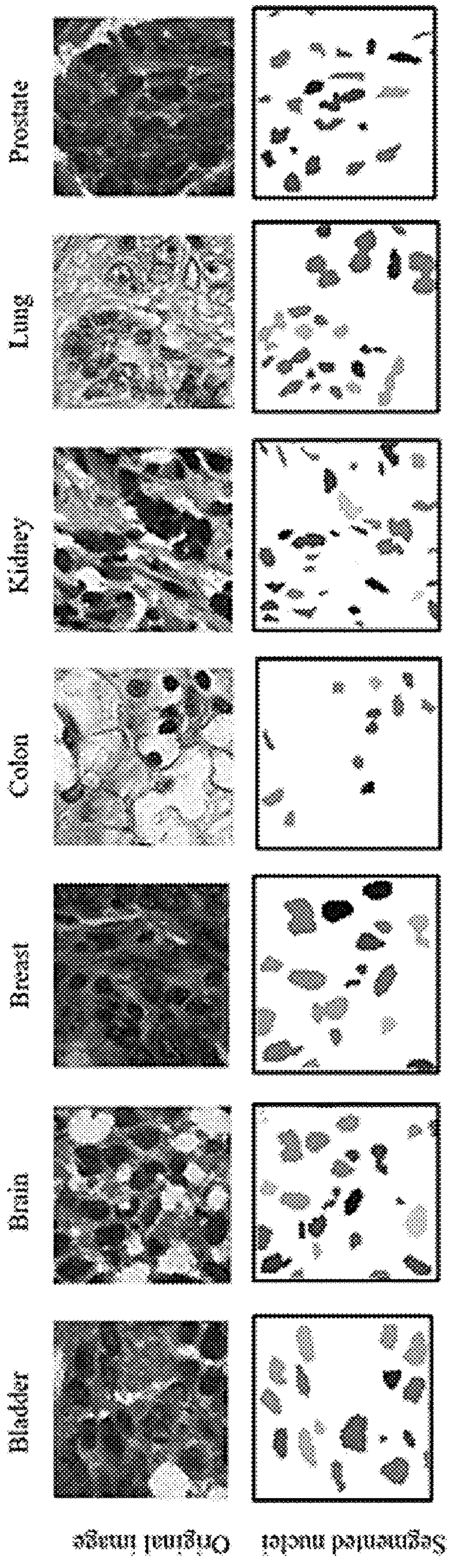
FIG. 2 shows sub-images of different organs cropped from MoNuSeg-2018 dataset and segmentation results.

The proposed model is qualitatively analyzed. As shown in FIG. 2, the seven sub-images were cropped from seven different MoNuSeg-2018 test images of seven different organs, where three organs (bladder, lung, prostate) not included in the training test and a validation set. Original images and nuclei segmentation images are listed in rows.

FIG. 2 shows that the proposed model can successfully segment individual nuclei, indicating that the proposed model has strong generalization ability. The overlap of certain nuclei and the diversity of tissue types, nucleus appearance, and H & E staining are not considered, and there are some false positive cases (over-segmentation) and false negative cases (under-segmentation), but their number is not significant relative to the total number of true positive cases.

For quantitative analysis, Table 1 lists the average values of aggregated Jaccard index (AJI), F1-score, and Dice for two test datasets. Some images in the NuInsSeg dataset show the nuclei of organs that are not present in the training set and the validation set. The test results are similar to those on the MoNuSeg-2018 dataset, indicating that the proposed model has strong generalization ability.

Table 2 shows the AJI, F1-score, and Dice of the proposed model in segmenting six types of organs in the MoNuSeg-2018 dataset. These values are relatively stable across different organ segmentation tasks. The stability of these scores is positive for the performance of the model, indicating that the model can maintain high consistency and stability in different organ segmentation tasks, which suggests that the model has strong applicability.

Table 3 shows that the proposed model achieves good performance in the nuclei segmentation task. Specifically, the model achieves a Dice score of 0.8311 and an AJI score of 0.6413 on the MoNuSeg dataset, showing an obvious improvement in the performance of the model compared to that on Hover-Net and CIA-Net. It should be noted that the proposed model is designed for multi-organ segmentation and has strong generalization ability. However, if it encounters an unfamiliar organ, it needs to be retrained.

What is claimed is:

1. A multi-organ nuclei segmentation method based on a prompt learning, comprising the following steps:

a) acquiring N brain nuclei images, N kidney nuclei images, N liver nuclei images, N breast nuclei images, N colon nuclei images, and N stomach nuclei images to form a nuclei image-text dataset T, $$T = \left\{ \begin{array}{c} \text{a nuclei photo of [brain]:} T_1^{brain}, T_2^{brain}, \ldots, T_i^{brain}, \ldots, T_N^{brain}; \\ \text{a nuclei photo of [kidney]:} T_1^{kidney}, T_2^{kidney}, \ldots, T_i^{kidney}, \ldots, T_N^{kidney}; \\ \text{a nuclei photo of [liver]:} T_1^{liver}, T_2^{liver}, \ldots, T_i^{liver}, \ldots, T_N^{liver}; \\ \text{a nuclei photo of [breast]:} T_1^{breast}, T_2^{breast}, \ldots, T_i^{breast}, \ldots, T_N^{breast}; \\ \text{a nuclei photo of [colon]:} T_1^{colon}, T_2^{colon}, \ldots, T_i^{colon}, \ldots, T_N^{colon} \\ \text{a nuclei photo of [stomach]:} T_1^{stomach}, T_2^{stomach}, \ldots, T_i^{stomach}, \\ \ldots, T_N^{stomach} \end{array} \right\},$$

wherein $$T_i^{brain}$$

denotes an i-th brain nuclei image, and a nuclei photo of [brain] is a medical prompt text template for brain;

$$T_i^{kidney}$$

denotes an i-th kidney nuclei image, and a nuclei photo of [kidney] is a medical prompt text template for kidney;

$$T_i^{liver}$$

denotes an i-th liver nuclei image, and a nuclei photo of [liver] is a medical prompt text template for liver;

$$T_i^{breast}$$

denotes an i-th breast nuclei image, and a nuclei photo of [breast] is a medical prompt text template for breast;

$$T_i^{colon}$$

denotes an i-th colon nuclei image, and a nuclei photo of [colon] is a medical prompt text template for colon; and $$T_i^{stomach}$$

denotes an i-th stomach nuclei image, and a nuclei photo of [stomach] is a medical prompt text template for stomach;

b) inputting the i-th brain nuclei image $$T_i^{brain}$$

and the medical prompt text template a nuclei photo of [brain] for brain, the i-th kidney nuclei image $$T_i^{kidney}$$

and the medical prompt text template a nuclei photo of [kidney] for kidney, the i-th liver nuclei image $$T_i^{liver}$$

and the medical prompt text template a nuclei photo of [liver] for liver, the i-th breast nuclei image $$T_i^{breast}$$

and the medical prompt text template a nuclei photo of [breast] for breast, the i-th colon nuclei image $$T_i^{colon}$$

and the medical prompt text template a nuclei photo of [colon] for colon, and the i-th stomach nuclei image $$T_i^{stomach}$$

and the medical prompt text template a nuclei photo of [stomach] for stomach in the nuclei image-text dataset T into a clip model to acquire an optimized clip model;

c) acquiring a brain nuclei images, b kidney nuclei images, c liver nuclei images, d breast nuclei images, e colon nuclei images, and f stomach nuclei images from a nuclei instance segmentation (NuInsSeg) dataset, a+b+c+d+e+f=n; and forming a nuclei image-text data-set Y, $$\begin{aligned} Y = \{ & \text{a nuclei photo of [brain]: } Y_1^{brain}, Y_2^{brain}, \ldots, Y_i^{brain}, \ldots, Y_a^{brain}; \\ & \text{a nuclei photo of [kidney]: } Y_1^{kidney}, Y_2^{kidney}, \ldots, Y_i^{kidney}, \ldots, Y_b^{kidney}; \\ & \text{a nuclei photo of [liver]: } Y_1^{liver}, Y_2^{liver}, \ldots, Y_i^{liver}, \ldots, Y_c^{liver}; \\ & \text{a nuclei photo of [breast]: } Y_1^{breast}, Y_2^{breast}, \ldots, Y_i^{breast}, \ldots, Y_d^{breast}; \\ & \text{a nuclei photo of [colon]: } Y_1^{colon}, Y_2^{colon}, \ldots, Y_i^{colon}, \ldots, Y_e^{colon} \\ & \text{a nuclei photo of [stomach]: } Y_1^{stomach}, Y_2^{stomach}, \ldots, \\ & Y_i^{stomach}, \ldots, Y_f^{stomach} \} \end{aligned} ,$$

wherein $$Y_i^{brain}$$

denotes an i-th brain nuclei image, $$Y_i^{kidney}$$

denotes an i-th kidney nuclei image, $$Y_i^{liver}$$

denotes an i-th liver nuclei image, $$Y_i^{breast}$$

denotes an i-th breast nuclei image, $$Y_i^{colon}$$

denotes an i-th colon nuclei image, and $$Y_i^{stomach}$$

denotes an i-th stomach nuclei image;

d) dividing the nuclei image-text dataset Y into a training set and a test set, and scaling the nuclei image in the training set to 572×572;

e) constructing a segmentation network model, comprising a text module, an image module, and a multilayer perceptron (MLP) module;

f) inputting the medical prompt text template in the training set into the text module to acquire a text vector;

g) inputting the nuclei image in the training set into the image module of the segmentation network model to acquire a nuclei segmentation result image and a feature vector;

h) inputting the feature vector into the MLP module of the segmentation network model to acquire a parameter;

i) updating the segmentation network model through the parameter to acquire an updated segmentation network model;

j) training the updated segmentation network model to acquire an optimized segmentation network model; and k) inputting the nuclei image in the test set into the optimized segmentation network model to acquire a final segmentation result image.

2. The multi-organ nuclei segmentation method based on the prompt learning according to claim 1, wherein N is 500.

3. The multi-organ nuclei segmentation method based on the prompt learning according to claim 1, wherein the step a) comprises:

acquiring the N brain nuclei images from a multi-organ nuclei segmentation (MoNuSeg) dataset and/or a CMP-15 dataset and/or a CMP-17 dataset and/or a nuclei instance segmentation dataset of cryosectioned hematoxylin-eosin-stained histological images (CryonNuSeg) dataset and/or the NuInsSeg dataset;

acquiring the N kidney nuclei images from the MoNuSeg dataset and/or a kumar dataset and/or an Irshad dataset and/or the CryonNuSeg dataset and/or a multi-organ nuclei segmentation and classification (MoNuSAC) dataset and/or the NuInsSeg dataset;

acquiring the N liver nuclei images from the MoNuSeg dataset and/or the CryonNuSeg dataset and/or a Crowedsourced dataset and/or the kumar dataset and/or the NuInsSeg dataset;

acquiring the N breast nuclei images from the MoNuSeg dataset and/or the MoNuSAC dataset and/or a nucleus classification, localization and segmentation (Nucls) dataset and/or a triple negative breast cancer (TNBC) dataset and/or a Janowczyk mCryonNuSeg dataset and/or a Gelasca dataset and/or a Naylor dataset and/or the MoNuSAC dataset and/or a NuInsSeg dataset and/or the kumar dataset;

acquiring the N colon nuclei images from a colorectal nuclei segmentation and phenotypes (CoNSeP) dataset and/or a CRCHisto dataset and/or the CryonNuSeg dataset and/or the NuInsSeg dataset and/or the kumar dataset; and acquiring the N stomach nuclei images from a MoNuSeg CryonNuSeg dataset and/or a Wienert dataset and/or the NuInsSeg dataset and/or the kumar dataset.

4. The multi-organ nuclei segmentation method based on the prompt learning according to claim 1, wherein the step d) comprises: dividing the nuclei image-text dataset Y into the training set and the test set at a ratio of 7:3.

5. The multi-organ nuclei segmentation method based on the prompt learning according to claim 1, wherein the step f) comprises:

f-1) constructing the text module of the segmentation network model, comprising the optimized clip model;

f-2) inputting the medical prompt text template a nuclei photo of [brain] for brain in the training set into the text module to acquire a text vector $$N_{brain},$$

$N_{brain} \in R^{L \times N}$, wherein R denotes a real number space, L denotes a length of a text, and N denotes a length of a last word in the text; and expanding, by a torch.unsqueeze function in a PyTorch library of Python, the text vector $N_{brain}$ by one channel dimension to acquire a text vector $$N'_{brain};$$

f-3) inputting the medical prompt text template a nuclei photo of [kidney] for kidney in the training set into the text module to acquire a text vector $N_{kidney}$, $N_{kidney} \in R^{L \times N}$; and expanding, by the torch.unsqueeze function in the PyTorch library of Python, the text vector $N_{kidney}$ by one channel dimension to acquire a text vector $$N'_{kidney};$$

f-4) inputting the medical prompt text template a nuclei photo of [liver] for liver in the training set into the text module to acquire a text vector $N_{liver}$, $N_{liver} \in R^{L \times N}$; and expanding, by the torch.unsqueeze function in the PyTorch library of Python, the text vector $N_{liver}$ by one channel dimension to acquire a text vector $$N'_{liver};$$

f-5) inputting the medical prompt text template a nuclei photo of [breast] for breast in the training set into the text module to acquire a text vector $N_{breast}$, $N_{breast} \in R^{L \times N}$; and expanding, by the torch.unsqueeze function in the PyTorch library of Python, the text vector $N_{breast}$ by one channel dimension to acquire a text vector $$N'_{breast};$$

f-6) inputting the medical prompt text template a nuclei photo of [colon] for colon in the training set into the text module to acquire a text vector $N_{colon}$, $N_{colon} \in R^{L \times N}$; and expanding, by the torch.unsqueeze function in the PyTorch library of Python, the text vector $N_{colon}$ by one channel dimension to acquire a text vector $$N'_{colon};$$

and f-7) inputting the medical prompt text template a nuclei photo of [stomach] for stomach in the training set into the text module to acquire a text vector $N_{stomach}$, $N_{stomach} \in R^{L \times N}$; and expanding, by the torch.unsqueeze function in the PyTorch library of Python, the text vector $N_{stomach}$ by one channel dimension to acquire a text vector $$N'_{stomach}.$$

6. The multi-organ nuclei segmentation method based on the prompt learning according to claim 5, wherein the step g) comprises:

g-1) constructing the image module of the segmentation network model, comprising an image encoder, an image decoder, and a generalizable approximate partitioning (GAP) module;

g-2) constructing the image encoder of the image module, comprising a first CRM, a second CRM, a third CRM, a fourth CRM, and a fifth CRM;

constructing the first CRM, the second CRM, the third CRM, and the fourth CRM, each comprising a first convolutional layer, a first rectified linear unit (ReLU) activation function, a second convolutional layer, a second ReLU activation function, and a max pooling layer in sequence;

constructing the fifth CRM, comprising a first convolutional layer, a first ReLU activation function, a second convolutional layer, and a second ReLU activation function in sequence;

inputting the i-th brain nuclei image $$Y_i^{brain}$$

in the training set into the first CRM to acquire a feature $$PE_1^{brain},$$

inputting the feature $$PE_1^{brain}$$

into the second CRM to acquire a feature $$PE_2^{brain},$$

inputting the feature $$PE_2^{brain}$$

into the third CRM to acquire a feature $$PE_3^{brain},$$

inputting the feature $$PE_3^{brain}$$

into the fourth CRM to acquire a feature $$PE_4^{brain},$$

and inputting the feature $$PE_4^{brain}$$

into the fifth CRM to acquire a feature $$PE_5^{brain};$$

inputting the i-th kidney nuclei image $$Y_i^{kidney}$$

in the training set into the first CRM to acquire a feature $$PE_1^{kidney},$$

inputting the feature $$PE_1^{kidney}$$

into the second CRM to acquire a feature $$PE_2^{kidney},$$

inputting the feature $$PE_2^{kidney}$$

into the third CRM to acquire a feature $$PE_3^{kidney},$$

inputting the feature $$PE_3^{kidney}$$

into the fourth CRM to acquire a feature $$PE_4^{kidney},$$

and inputting the feature $$PE_4^{kidney}$$

into the fifth CRM to acquire a feature $$PE_5^{kidney};$$

inputting the i-th liver nuclei image $$Y_i^{liver}$$

in the training set into the first CRM to acquire a feature $$PE_1^{liver},$$

inputting the feature $$PE_1^{liver}$$

into the second CRM to acquire a feature $$PE_2^{liver},$$

inputting the feature $$PE_2^{liver}$$

into the third CRM to acquire a feature $$PE_3^{liver},$$

inputting the feature $$PE_3^{liver}$$

into the fourth CRM to acquire a feature $$PE_4^{liver},$$

and inputting the feature $$PE_4^{liver}$$

into the fifth CRM to acquire a feature $$PE_5^{liver};$$

inputting the i-th breast nuclei image $$Y_i^{breast}$$

in the training set into the first CRM to acquire a feature $$PE_1^{breast},$$

inputting the feature $$PE_1^{breast}$$

into the second CRM to acquire a feature $$PE_2^{breast},$$

inputting the feature $$PE_2^{breast}$$

into the third CRM to acquire a feature $$PE_3^{breast},$$

inputting the feature $$PE_3^{breast}$$

into the fourth CRM to acquire a feature $$PE_4^{breast},$$

and inputting the feature $$PE_4^{breast}$$

into the fifth CRM to acquire a feature $$PE_5^{breast};$$

inputting the i-th colon nuclei image $$Y_i^{colon}$$

in the training set into the first CRM to acquire a feature $PE_1^{colon}$, inputting the feature $PE_1^{colon}$ into the second CRM to acquire a feature $PE_2^{colon}$, inputting the feature $PE_2^{colon}$ into the third CRM to acquire a feature $PE_3^{colon}$, inputting the feature $PE_3^{colon}$ into the fourth CRM to acquire a feature $PE_4^{colon}$, and inputting the feature $PE_4^{colon}$ into the fifth CRM to acquire a feature $PE_5^{colon}$;

and inputting the i-th stomach nuclei image $Y_i^{stomach}$ in the training set into the first CRM to acquire a feature $PE_1^{stomach}$, inputting the feature $PE_1^{stomach}$ into the second CRM to acquire a feature $PE_2^{stomach}$, and inputting the feature $PE_2^{stomach}$ into the third CRM to acquire a feature $PE_3^{stomach}$, inputting the feature $PE_3^{stomach}$ into the fourth CRM to acquire a feature $PE_4^{stomach}$, and inputting the feature $PE_4^{stomach}$ into the fifth CRM to acquire a feature $PE_5^{stomach}$;

g-3) constructing the image decoder of the image module, comprising a first GRU module, a second GRU module, a third GRU module, and a fourth GRU module;

constructing the first GRU module, the second GRU module, the third GRU module, and the fourth GRU module, each comprising a first convolutional layer, a first ReLU activation function, a second convolutional layer, a second ReLU activation function, and an upsampling layer in sequence;

inputting the feature $PE_5^{brain}$ into the first GRU to acquire a feature $PO_1^{brain}$, inputting the feature $PO_1^{brain}$ into the second GRU to acquire a feature $PO_2^{brain}$, inputting the feature $PO_2^{brain}$ into the third GRU to acquire a feature $PO_3^{brain}$, and inputting the feature $PO_3^{brain}$ into the fourth GRU to acquire a brain nuclei segmentation result image $PO_4^{brain}$;

inputting the feature $PE_5^{kidney}$ into the first GRU to acquire a feature $PO_1^{kidney}$, inputting the feature $PO_1^{kidney}$ into the second GRU to acquire a feature $PO_2^{kidney}$, inputting the feature $PO_2^{kidney}$ into the third GRU to acquire a feature $PO_3^{kidney}$, and inputting the feature $PO_3^{kidney}$ into the fourth GRU to acquire a kidney nuclei segmentation result image $PO_4^{kidney}$;

inputting the feature $PE_5^{liver}$ into the first GRU to acquire a feature $PO_1^{liver}$, inputting the feature $PO_1^{liver}$ into the second GRU to acquire a feature $PO_2^{liver}$, inputting the feature $PO_2^{liver}$ into the third CRM-GRU to acquire a feature $PO_3^{liver}$, and inputting the feature $PO_3^{liver}$ into the fourth GRU to acquire a liver nuclei segmentation result image $$PO_4^{liver};$$

inputting the feature $$PE_5^{breast}$$

into the first GRU to acquire a feature $$PO_1^{breast},$$

inputting the feature $$PO_1^{breast}$$

into the second GRU to acquire a feature $$PO_2^{breast},$$

inputting the feature $$PO_2^{breast}$$

into the third GRU to acquire a feature $$PO_3^{breast},$$

and inputting the feature $$PO_3^{breast}$$

into the fourth GRU to acquire a breast nuclei segmentation result image $$PO_4^{breast};$$

inputting the feature $$PE_5^{colon}$$

into the first GRU to acquire a feature $$PO_1^{colon},$$

inputting the feature $$PO_1^{colon}$$

into the second GRU to acquire a feature $$PO_2^{colon},$$

inputting the feature $$PO_2^{colon}$$

into the third GRU to acquire a feature $$PO_3^{colon},$$

and inputting the feature $$PO_3^{colon}$$

into the fourth GRU to acquire a colon nuclei segmentation result image $$PO_4^{colon};$$

and inputting the feature $$PE_5^{stomach}$$

into the first GRU to acquire a feature $$PO_1^{stomach},$$

inputting the feature $$PO_1^{stomach}$$

into the second GRU to acquire a feature $$PO_2^{stomach},$$

inputting the feature $$PO_2^{stomach}$$

into the third GRU to acquire a feature $$PO_3^{stomach},$$

and inputting the feature $$PO_3^{stomach}$$

into the fourth GRU to acquire a stomach nuclei segmentation result image $$PO_4^{stomach};$$

and g-4) constructing the GAP module of the image module, comprising a batch normalization (BN) layer, a ReLU activation function, and an adaptive average pooling layer;

inputting the feature $$PE_5^{brain}$$

into the GAP module to acquire a feature $PG^{brain}$, inputting the feature P $$PE_5^{kidney}$$

into the GAP module to acquire a feature $PG^{kidney}$, inputting the feature $$PE_5^{liver}$$

into the GAP module to acquire a feature $PG^{liver}$, inputting the feature $$PE_5^{breast}$$

into the GAP module to acquire a feature $PG^{breast}$, inputting the feature $$PE_5^{colon}$$

into the GAP module to acquire a feature $PG^{colon}$, and inputting the feature $$PE_5^{stomach}$$

into the GAP module to acquire a feature $PG^{stomach}$; and concatenating the feature $PG^{brain}$ and the text vector $$N'_{brain}$$

to acquire a feature vector $$N_{mer}^{brain},$$

concatenating the feature $PG^{kidney}$ and the text vector $$N'_{kidney}$$

to acquire a feature vector $$N_{mer}^{kidney},$$

concatenating the feature $PG^{liver}$ and the text vector $$N'_{liver}$$

to acquire a feature vector $$N_{mer}^{liver},$$

concatenating the feature $PG^{breast}$ and the text vector $$N'_{breast}$$

to acquire a feature vector $$N_{mer}^{breast},$$

concatenating the feature $PG^{colon}$ and the text vector $$N'_{colon}$$

to acquire a feature vector $$N_{mer}^{colon},$$

and concatenating the feature $PG^{stomach}$ and the text vector $$N'_{stomach}$$

to acquire a feature vector $$N_{mer}^{stomach}.$$

7. The multi-organ nuclei segmentation method based on the prompt learning according to claim 6, wherein the step h) comprises:

h-1) constructing the MLP module of the segmentation network model, comprising a first convolutional layer, a second convolutional layer, and a third convolutional layer in sequence, wherein the first convolutional layer, the second convolutional layer, and the third convolutional layer each comprise a convolutional kernel with a size of 1*1;

h-2) inputting the feature vector $$N_{mer}^{brain}$$

into the MLP module to acquire a feature $$N_1^{brain},$$

inputting the feature vector $$N_{mer}^{kidney}$$

into the MLP module to acquire a feature $$N_1^{kidney},$$

inputting the feature vector $$N_{mer}^{liver}$$

into the MLP module to acquire a feature $$N_1^{liver},$$

inputting the feature vector $$N_{mer}^{breast}$$

into the MLP module to acquire a feature $$N_1^{breast},$$

inputting the feature vector $$N_{mer}^{colon}$$

into the MLP module to acquire a feature $$N_1^{colon},$$

and inputting the feature vector $$N_{mer}^{stomach}$$

into the MLP module to acquire a feature $$N_1^{stomach};$$

and h-3) inputting the feature $$N_1^{brain}$$

into a Sigmoid function to acquire a parameter $$\theta_1^{brain},$$

inputting the feature $$N_1^{kidney}$$

into the Sigmoid function to acquire a parameter $$\theta_1^{kidney},$$

inputting the feature $$N_1^{liver}$$

into the Sigmoid function to acquire a parameter $$\theta_1^{liver},$$

inputting the feature $$N_1^{breast}$$

into the Sigmoid function to acquire a parameter $$\theta_1^{breast},$$

inputting the feature $$N_1^{colon}$$

into the Sigmoid function to acquire a parameter $$\theta_1^{colon},$$

and inputting the feature $$N_1^{stomach}$$

into the Sigmoid function to acquire a parameter $$\theta_1^{stomach}.$$

8. The multi-organ nuclei segmentation method based on the prompt learning according to claim 7, wherein the step i) comprises:

i-1) performing, by a reshape function in the PyTorch library of Python, a reshape operation, through the parameter $$\theta_1^{brain},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a first update of the image encoder; performing, by the reshape function in the PyTorch library of Python, a reshape operation, through the parameter $$\theta_1^{brain},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a first update of the image decoder;

i-2) performing, by the reshape function in the PyTorch library of Python, a reshape operation, through the parameter $$\theta_1^{kidney},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a second update of the image encoder; performing, by the reshape function in the PyTorch library of Python, a reshape operation, through the parameter $$\theta_1^{kidney},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a second update of the image decoder;

i-3) performing, by the reshape function in the PyTorch library of Python, a reshape operation, through the parameter $$\theta_1^{liver},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a third update of the image encoder; performing, by the reshape function in the PyTorch library of Python, a reshape operation, through the parameter $$\theta_1^{liver},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a third update of the image decoder;

i-4) performing, by the reshape function in the PyTorch library of Python, a reshape operation, through the parameter $$\theta_1^{breast},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a fourth update of the image encoder; performing, by the reshape function in the PyTorch library of Python, a reshape operation, through the parameter $$\theta_1^{breast},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a fourth update of the image decoder;

i-5) performing, by the reshape function in the PyTorch library of Python, a reshape operation, through the parameter $$\theta_1^{colon},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a fifth update of the image encoder; performing, by the reshape function in the PyTorch library of Python, a reshape operation, through the parameter $$\theta_1^{colon},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a fifth update of the image decoder; and i-6) performing, by the reshape function in the PyTorch library of Python, a reshape operation, through the parameter $$\theta_1^{stomach},$$

in the first convolutional layer and the second convolutional layer of each of the first CRM, the second CRM, the third CRM, the fourth CRM, and the fifth CRM of the image encoder; performing a convolution, and an operation by the ReLU activation function in sequence to complete a sixth update of the image encoder; performing, by the reshape function in the PyTorch library of Python, a reshape operation, through the parameter $$\theta_1^{stomach},$$

in the first convolutional layer and the second convolutional layer of each of the first GRU module, the second GRU module, the third GRU module, and the fourth GRU module of the image decoder; and performing a convolution, and an operation by the ReLU activation function in sequence to complete a sixth update of the image decoder, thereby acquiring the updated segmentation network model.

9. The multi-organ nuclei segmentation method based on the prompt learning according to claim 1, wherein the step j) comprises: training, by an adaptive moment estimation (Adam) optimizer, the updated segmentation network model through a Dice similarity coefficient (DSC) loss function to acquire the optimized segmentation network model.

10. The multi-organ nuclei segmentation method based on the prompt learning according to claim 6, wherein the step k) comprises:

k-1) inputting the i-th brain nuclei image $$Y_i^{brain}$$

in the training set into the image encoder and the image decoder of the image module in the optimized segmentation network model in sequence to acquire a final brain nuclei segmentation result image $$PO_4'^{brain};$$

k-2) inputting the i-th kidney nuclei image $$Y_i^{kidney}$$

in the training set into the image encoder and the image decoder of the image module in the optimized segmentation network model in sequence to acquire a final kidney nuclei segmentation result image $$PO_4'^{kidney};$$

k-3) inputting the i-th liver nuclei image $$Y_i^{liver}$$

in the training set into the image encoder and the image decoder of the image module in the optimized segmentation network model in sequence to acquire a final liver nuclei segmentation result image $$PO_4'^{liver};$$

k-4) inputting the i-th breast nuclei image $$Y_i^{breast}$$

in the training set into the image encoder and the image decoder of the image module in the optimized segmentation network model in sequence to acquire a final breast nuclei segmentation result image $$PO_4'^{breast};$$

k-5) inputting the i-th colon nuclei image $$Y_i^{colon}$$

in the training set into the image encoder and the image decoder of the image module in the optimized segmentation network model in sequence to acquire a final colon nuclei segmentation result image $$PO_4'^{colon};$$

and k-6) inputting the i-th stomach nuclei image $$Y_i^{stomach}$$

in the training set into the image encoder and the image decoder of the image module in the optimized segmentation network model in sequence to acquire a final stomach nuclei segmentation result image $$PO_4'^{stomach}.$$

* * * * *